United States Patent Office 3,506,362
Patented Apr. 14, 1970

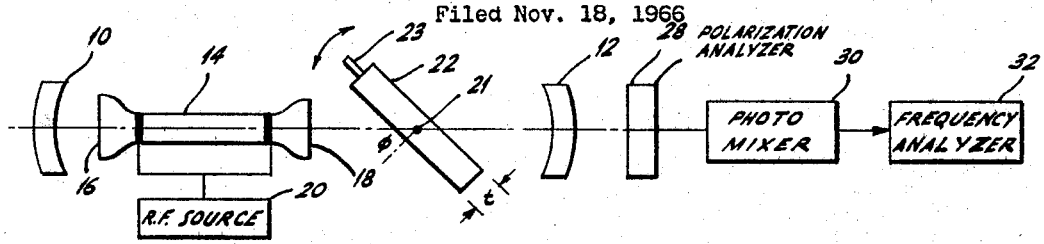
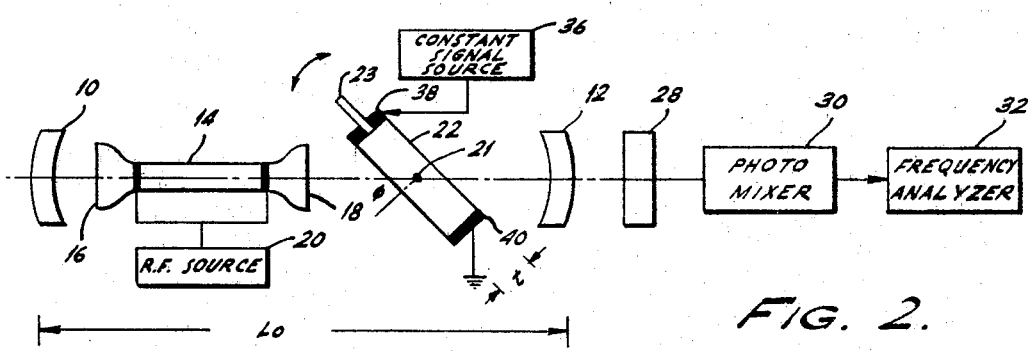
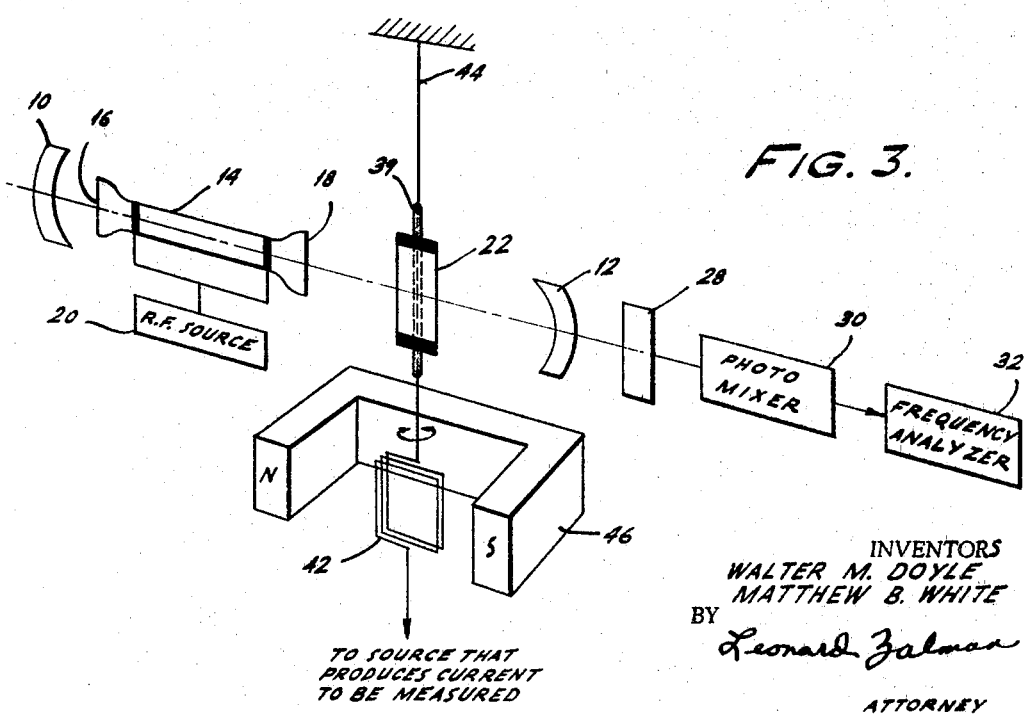

3,506,362
LASER SYSTEM WHICH INDICATES THE ANGULAR POSITION OF AN OPTICALLY ANISOTROPIC ELEMENT
Walter M. Doyle, Laguna Beach, and Matthew B. White, Newport Beach, Calif., assignors to Philco-Ford Corporation, Philadelphia, Pa., a corporation of Delaware
Filed Nov. 18, 1966, Ser. No. 595,404
Int. Cl. G01b 9/02; H01s 3/00
U.S. Cl. 356—111          9 Claims

ABSTRACT OF THE DISCLOSURE

A laser system adapted to produce a signal the frequency of which is indicative of the angular position with respect to the laser beam incident thereon of a birefringent, optically transmissive device disposed within the laser cavity. The laser cavity has disposed therein a discharge tube shaped so as not to favor a particular oscillation mode of polarization, and a rotatable optically transmissive device which, by introducing into the laser cavity an optical anisotropy, restricts laser oscillation modes so that only two orthogonally polarized light beams exit the laser cavity. Rotation of the optically transmissive device changes the difference between the respective oscillation frequencies of said orthogonally polarized light beams by changing the respective effective path lengths, within the laser cavity, of the two beams. That frequency difference is detected by a photomixer disposed externally of the laser cavity.

Lasers have been developed which employ a discharge tube with anti-reflection coated windows oriented perpendicular to the tube axis. Such lasers, when provided with external reflectors, are capable of supporting oscillation modes of any polarization.

We have recently discovered that lasers of the type described are extremely responsive to intra-cavity optical anistropy. More specifically, it has become evident that laser mode frequencies are highly responsive to birefringence, electro-optical and magneto-optical effects when these effects appear in an optical element located within a laser cavity. Systems making use of this property are described in our co-pending U.S. patent application Ser. No. 475,757, filed July 29, 1965.

More recently we have discovered that lasers responsive to intra-cavity optical anisotropy are extremely sensitive rotation sensors. More particularly, it has become evident that laser mode frequencies are highly responsive to rotation of an intra-cavity optical element that exhibits birefringence, electro-optical and magneto-optical effects.

It is an object of the present invention to employ this sensitivity of the laser system to rotation of an intra-cavity optical element that exhibits optical anisotropy to provide a rotation sensor.

Another object of the present invention is to employ this sensitivity of the laser system to rotation of an intra-cavity optical element that exhibits optical anisotropy to provide an angular deflection measuring system.

Another object of the present invention is to employ this sensitivity of the laser system to rotation of an intra-cavity optical element that exhibits optical anisotropy to provide a torque measuring system.

In general, these and other objects of the present invention are achieved by a laser system comprising two or more reflectors which establish a closed optical path therebetween, a discharge tube disposed in said path and shaped so as not to favor a particular axial oscillation mode polarization state, optically transmissive means disposed in said path of optical energy between said reflectors, said means introducing anisotropy of known characteristics, and means for rotating said optical transmissive means in response to an external condition to alter the optical characteristics of said optically transmissive means. In a preferred embodiment of the present invention means are also provided for measuring the signals produced by said laser system.

For a better understanding of the present invention together with other and further objects thereof reference should now be made to the following detailed description which is to be read in conjunction with the accompanying drawing in which:

FIG. 1 is a diagram showing one embodiment of the system of the present invention;

FIG. 2 is a diagram showing another embodiment of the system of the present invention; and FIG. 3 is a diagram of a galvanometer utilizing the concept of the present invention.

In FIG. 1 two spherical reflectors 10 and 12 define the ends of an optical path extending therebetween. A laser tube 14 is disposed in said path. Typically laser tube 14 may comprise a plasma tube having fused silica windows 16 and 18 which are normal or nearly normal to the optical path between reflectors 10 and 12. The windows 16 and 18 may be anti-reflection coated if necessary in order to reduce optical losses within the laser system. Windows 16 and 18 may also be oriented at a slight angle to the normal, i.e., displaced by a few degrees, for example 2°, from the normal in order to minimize resonances between the two windows 16 and 18 as a result of partial reflections therefrom. Plasma tube 14 may include a mixture of helium and neon and conveniently the system may operate at the 1.15 micron He-Ne transition. The internal surface of tube 14 may be roughened or frosted to minimize specular reflection from the walls of tube 14.

A conventional RF pumping source 20 is coupled to plasma tube 14 in a conventional manner.

Block 22 represents schematically a rotatable optical transmissive device which is arranged to introduce an optical anisotropy into the optical path between reflectors 10 and 12. Device 22 is preferably a naturally birefringent crystal, such as calcite. Device 22 may be coated to minimize reflection at the laser output frequency.

Device 22 is supported for rotation about an axis of rotation 21 which is perpendicular to the plane of FIGURE 1. The optical axis of device 22 is parallel to the axis of rotation 21. Device 22 may be supported for rotation by a pair of low friction pivots (not shown). Additional supporting means (not shown), such as springs, may be provided to position the device 22 so that the optical path between reflectors 10 and 12 normally intersects the perpendicular to the surface of device 22 at the angle $\phi$.

The device 22 is coupled to a lever 23 or a similar device for transmitting rotary force or motion. Lever 23 rotates device 22 in response to the linear displacement of or the torque exerted upon the end of lever 23 remote from device 22. Alternatively the force may be applied or the motion imparted to a shaft member or the like (not shown) extending along axis 21.

Reflector 12 is preferably slightly transmissive, for example 5% transmissive, so that some energy exits through this reflector and passes through a polarization analyzer 28 which may be a Nicol prism. The light passing through analyzer 28 is intercepted by a photomixer 30. Photomixer 30 comprises the input to a frequency analyzer 32.

When a naturally birefringent crystal is employed as the device 22, the only stationary laser modes that can be established involve light that is plane-polarized either perpendicular to or parallel to the optic axis of the crystal.

Light polarized in any other manner cannot simultaneously maintain its polarization state and fulfill the condition for constructive interference necessary for a stationary laser mode.

The beam having a polarization parallel to the optic axis of the crystal will have a velocity through the crystal which is different from the velocity of the beam having a polarization perpendicular to this direction. This difference in velocity will result in a difference in effective path length of the two beams in the optical system established by reflectors 10 and 12 and hence a difference in frequency between the beam polarized parallel to the optic axis and the beam polarized perpendicular to the optic axis. The magnitude of the frequency difference between the beam polarized parallel to the optic axis and the beam polarized perpendicular to the optic axis will be proportional to the degree of birefringence of the crystal and the effective thickness of the crystal.

After the two beams pass through reflector 12 and polarizer 28, which is preferably oriented at 45° with respect to the planes of polarization of the two beams, photomixer 30 optically heterodynes the two coherent, parallel light beams leaving polarizer 28 to yield a difference frequency beat note. Photomixer 30 may comprise a conventional photo-diode such as an InAs photodetector.

If the crystal is rotated from its normal angular position $\phi$ by an amount $\Delta\phi$, the effective thickness of the crystal through which each mode must propagate is changed. Since the crystal has a different effect on the velocity of the beam having a polarization parallel to its optic axis than it has on the velocity of the beam having a polarization perpendicular to its optic axis and this effect on the velocity of the beam is dependent upon the effective thickness of the crystal, rotation of the crystal from its normal angular position will change the frequency difference between the two beams. It can be shown that this frequency difference between the two beams will change upon rotation of the crystal from its normal position in accordance with the formula:

$$\Delta f = \frac{f(\text{opt})}{Lo} \Delta\phi t \sin\phi \cos\phi \left[ \frac{1}{(Ne^2 - \sin^2\phi)^{1/2}} - \frac{1}{(No^2 - \sin^2\phi)^{1/2}} \right] \quad (1)$$

where $No$ and $Ne$ are the ordinary and extraordinary indices of refraction of the crystal, $f(\text{opt})$ is the laser output frequency, $t$ is the thickness of the crystal, and $Lo$ is the length of the optical path established by reflectors 10 and 12. Inserting the reasonable values $f(\text{opt}) = 3 \times 10^{14}$ c.p.s. (appropriate for the $\lambda = 1.15\mu$ transition of He-Ne)
$Lo = 10^2$ cm.
$t = 1$ mm.
$\phi = 45°$ (for maximum sensitivity)
$No = 1.658$
$Ne = 1.486$ For calcite:

in Equation 1 one obtains $$\Delta f = 3 \times 10^{10} \Delta\phi \quad (2)$$

as the equation relating frequency shift to angular rotation.

In view of the fact that He-Ne gas lasers whose output frequencies are stable to within 1 megacycle per second are now available commercially, it is possible to stabilize the mode separation frequency of a dual polarization laser to within 3 cycles per second. Using Equation 2, this provides a minimum detectable angular displacement of $$(\Delta\phi)_{\text{min}} = 10^{-10} \text{ radians} \quad (3)$$

It is clear from Equation 1 that the sensitivity of the system can be adjusted by choosing appropriate values for the thickness $t$ of device 22 and the length of the optical path $Lo$ established by reflectors 10 and 12.

Although the system of the present invention has been described by an embodiment in which the optical anisotropy of device 22 is produced by a naturally birefringent crystal, in other embodiments of the invention intra-cavity optical anisotropy may be produced by a magnetic field, an electrostatic field, or mechanical stress applied to a device that produces optical anisotropy in response to one or more of these conditions. FIG. 2, in which parts corresponding to like parts in FIG. 1 have been identified by the same reference numerals, shows an embodiment of the invention in which intra-cavity optical anisotropy is produced in response to a constant voltage source 36 which is coupled to device 22 by electrodes 38 and 40. Since the embodiment of FIG. 2 operates in the same manner as that of FIG. 1, no separate description of the operation of the embodiment of FIG. 2 is required.

The ability of the system of the present invention to detect very small angular displacements, $10^{-10}$ radians, makes it a high precision sensing instrument. For example, the device of the present invention could be used as a component of a galvanometer. A galvanometer utilizing the concept of the present invention is shown in FIG. 3. Parts of FIG. 3 corresponding to like parts of FIG. 1 have been identified by the same reference numerals.

In the galvanometer of FIG. 3, a rotatable coil 42 is suspended by an electrically conductive cable 44 between the poles of a permanent magnet 46. The end of coil 42 remote from cable 44 is connected to a source that produces a current to be measured. Device 22 is also supported by cable 44, but electrically insulated therefrom by a tubular insulator 39.

When the electrical current to be measured passes through coil 42, the magnetic field produced by coil 42 reacts with the magnetic field of magnet 46, producing a torque. Coil 42 rotates due to this torque. This rotation causes the cable 44 and hence the device 22 to rotate. Cable 44 provides restoring torque to coil 42 when coil 42 has rotated. Since the current through coil 42 will determine the angular displacement of device 22 and the angular displacement of device 22 will determine the difference frequency beat note at the output of photomixer 30, the frequency of the output signal of photomixer 30 will be a known function of the current through coil 42. If the difference frequency beat note output signal from photo-mixer 30 is calibrated for known values of current flowing in coil 42, the device of FIG. 3 will indicate or measure the magnitude of an electrical current.

In addition to the use of the device of the present invention as a component of a galvanometer, the device could be used as a component of seismometers, linear accelerometers, magnetometers, and electrometers. The readouts of all of these instruments would be in the form of alternating currents whose frequencies would indicate the magnitude of the quantity measured.

What we claim is:

1. A rotation sensor comprising a laser including a plurality of reflectors which establish an optical path therebetween, one of said reflectors being partially transmissive, a discharge tube including a laser medium, said tube being disposed in said path and shaped so as not to favor any particular oscillation mode of polarization, means for pumping said discharge tube, and an optically transmissive means subject to rotation disposed in said path, said optically transmissive means exhibiting an optical anisotropy, means responsive to an external force to rotate said optically transmissive means to alter the optical anisotropy encountered by radiant energy from said tube traversing said optical path, a photomixing detector positioned to intercept radiant energy exiting from said optical path through said partially transmissive reflector, and a polarization analyzer positioned intermediate said detector and said partially transmissive reflector.

2. A rotation sensor comprising a laser including a plurality of reflectors which establish an optical path therebetween, one of said reflectors being partially transmissive, a plasma tube including a laser medium, said tube being positioned in said optical path, said plasma tube having substantially non-reflective exit windows positioned at approximately right angles to said path to permit a plurality of axial laser modes of oscillation to exist in said tube, and a naturally birefringent crystal positioned in said optical path so as to intercept radiant energy issuing from one of said windows, said crystal permitting only those of said modes plane-polarized perpendicular or parallel to the optical axis of said crystal to exist in said optical path, means for establishing said crystal in a first position to produce an output signal in which the frequency difference between said modes polarized perpendicular to said optical axis and said modes polarized parallel to said optical axis has a first value, means for permitting said crystal to rotate in response to a force exerted thereon, the frequency difference between said modes polarized perpendicular to said optical axis and said modes polarized parallel to said optical axis changing from said first value to other values as said crystal is rotated from said first position to other positions, a photomixing detector positioned to intercept radiant energy exiting from said optical path through said partially transmissive reflector, and a polarization analyzer positioned intermediate said detector and said partially transmissive reflector.

3. A rotation sensor comprising a laser including a plurality of reflectors which establish an optical path therebetween a discharge tube including a laser medium, said tube being disposed in said path and shaped so as not to favor any particular oscillation mode of polarization, means for pumping said discharge tube to produce coherent radiant energy within said path and an optically transmissive means subject to rotation disposed in said path, said optically transmissive means exhibiting an optical anisotropy, means responsive to an external force to rotate said optically transmissive means to alter the optical anisotropy encountered by said radiant energy, means for obtaining outside said path a portion of said radiant energy within said path, a photomixing detector positioned to intercept at least a portion of said obtained radiant energy, and a polarization analyzer positioned both intermediate said photomixing detector and said path and in the path of said obtained radiant energy.

4. The system of claim 1 in which said means for rotating said optically transmissive means comprises a device coupled to said optically transmissive means that rotates said optically transmissive means in response to the torque exerted upon said device.

5. The system of claim 4 in which said optically transmissive means is supported for rotation about an axis that is parallel to the optical axis of said optically transmissive means.

6. The system of claim 4 wherein said optically transmissive means comprises means responsive to an electrical signal to control said optical anisotropy of said optically transmissive means.

7. The system of claim 1 in which said means for rotating said optically transmissive means comprises a device coupled to said optically transmissive means that rotates said optically transmissive means in response to the linear displacement of said device.

8. The system of claim 7 in which said optically transmissive means is supported for rotation about an axis that is parallel to the optical axis of said optically transmissive means.

9. The system of claim 8 said optically transmissive means comprises means responsive to an electrical signal to control said optical anisotropy of said optically transmissive means.

References Cited

UNITED STATES PATENTS 3,414,839   12/1968   Bridges et al. _____ 331—94.5

OTHER REFERENCES

Targ, R., "Optical Heterodyne Detection of Microwave-Modulated Light," Proc. IEEE, March 1964, pp. 303–4.

Targ, R., et al., Laser Frequency Translation by Means of Electro-Optic Coupling-Control," Proc. IEEE, October 1964, pp. 1247–8.

RONALD L. WIBERT, Primary Examiner

R. J. WEBSTER, Assistant Examiner

U.S. Cl. X.R.

331—94.5; 356—106, 152